United States Patent [19]

Grooss

[11] 3,768,672

[45] Oct. 30, 1973

[54] REPLACEABLE TRUCK BODY AND METHOD FOR USING SAME

[75] Inventor: Frank A. Grooss, Morton, Ill.

[73] Assignee: Caterpillar Tractor Co., Pearin, Ill.

[22] Filed: Feb. 24, 1972

[21] Appl. No.: 228,884

[52] U.S. Cl............... 214/82, 180/24.11, 280/34 R
[51] Int. Cl............................................. B65f 1/12
[58] Field of Search................... 280/34, 81 R, 106, 280/106.5; 296/23 MC; 180/24.11; 298/17 R; 214/82

[56] References Cited
UNITED STATES PATENTS

| | | | |
|---|---|---|---|
| 3,393,922 | 7/1968 | Adams.......................... | 296/23 MC |
| 3,537,727 | 11/1970 | Tantlinger.......................... | 280/34 R |
| 2,741,489 | 4/1956 | Bigge.............................. | 280/106 T |
| 3,209,850 | 10/1965 | Fish................................. | 280/81 R |
| 3,436,096 | 4/1969 | Rogge.............................. | 280/34 R |

Primary Examiner—Robert R. Song
Attorney—Paul S. Lempio et al.

[57] ABSTRACT

The standard body of a truck is replaced by an elongated one having a greater load carrying capacity. An auxiliary frame assembly is connected in tamdem to the truck's main frame assembly prior to such replacement.

12 Claims, 5 Drawing Figures

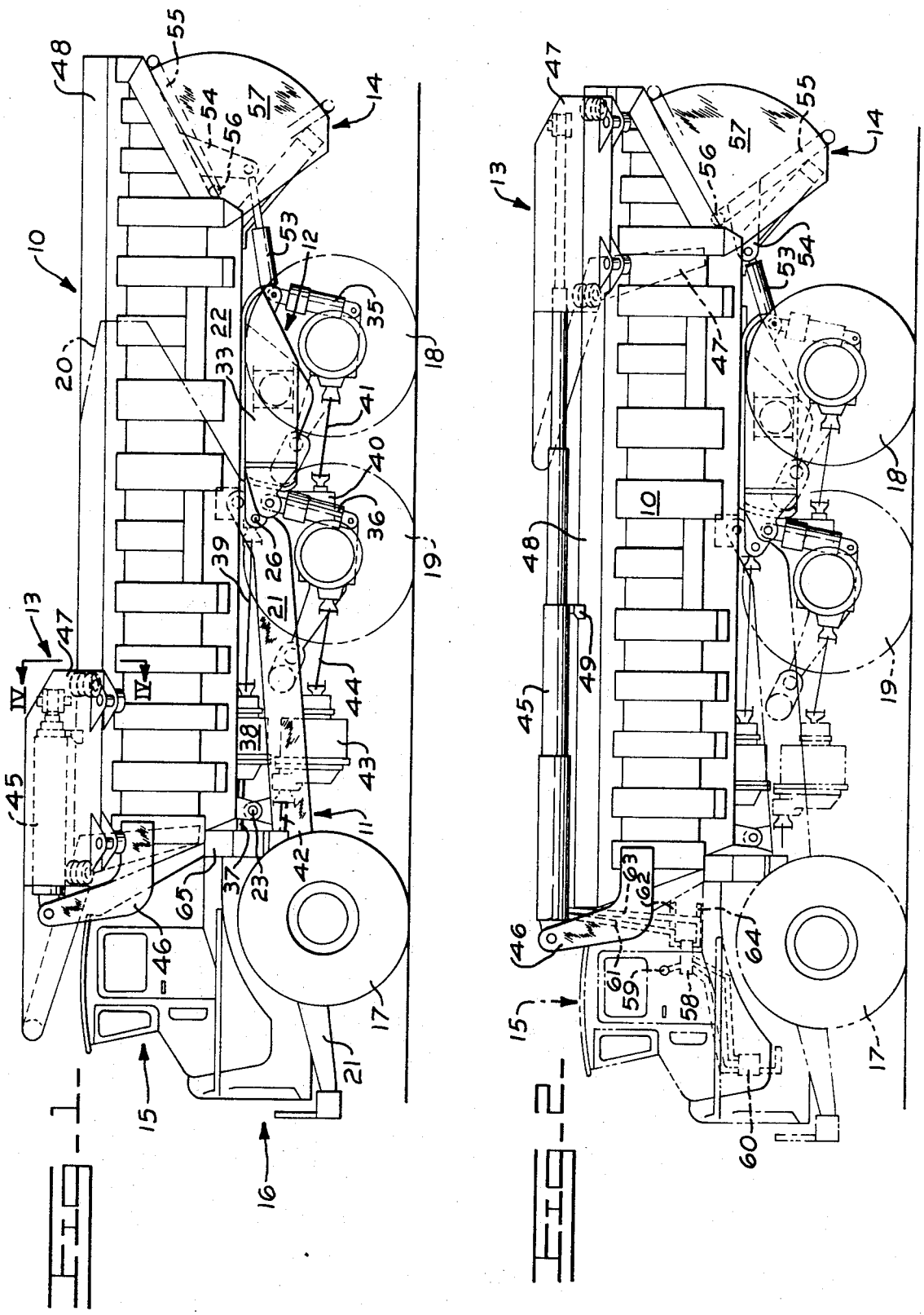

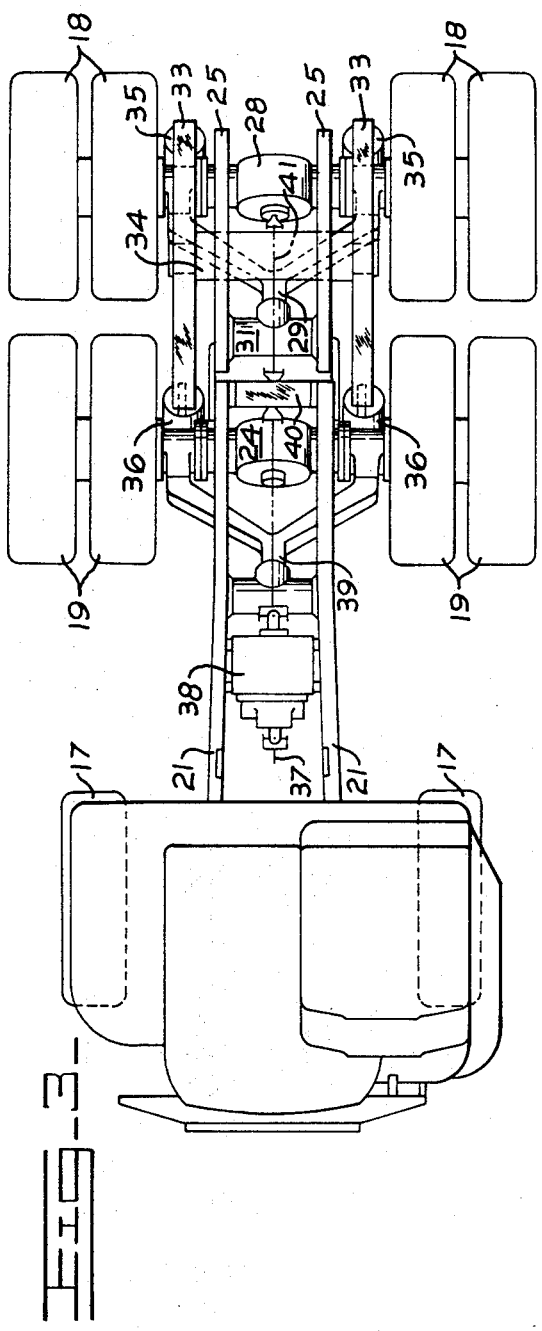
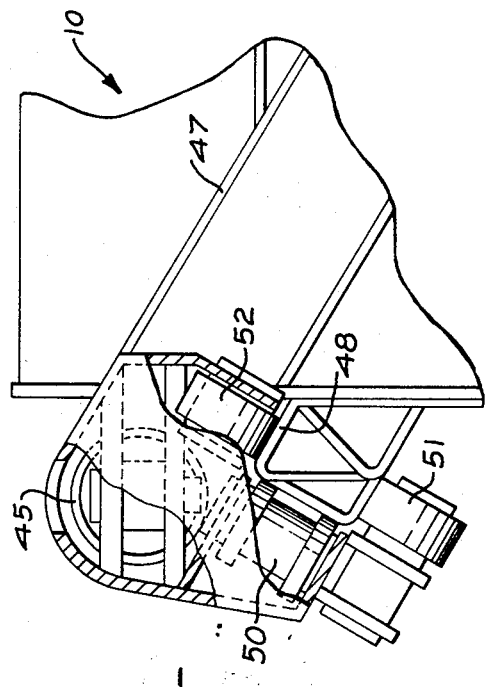

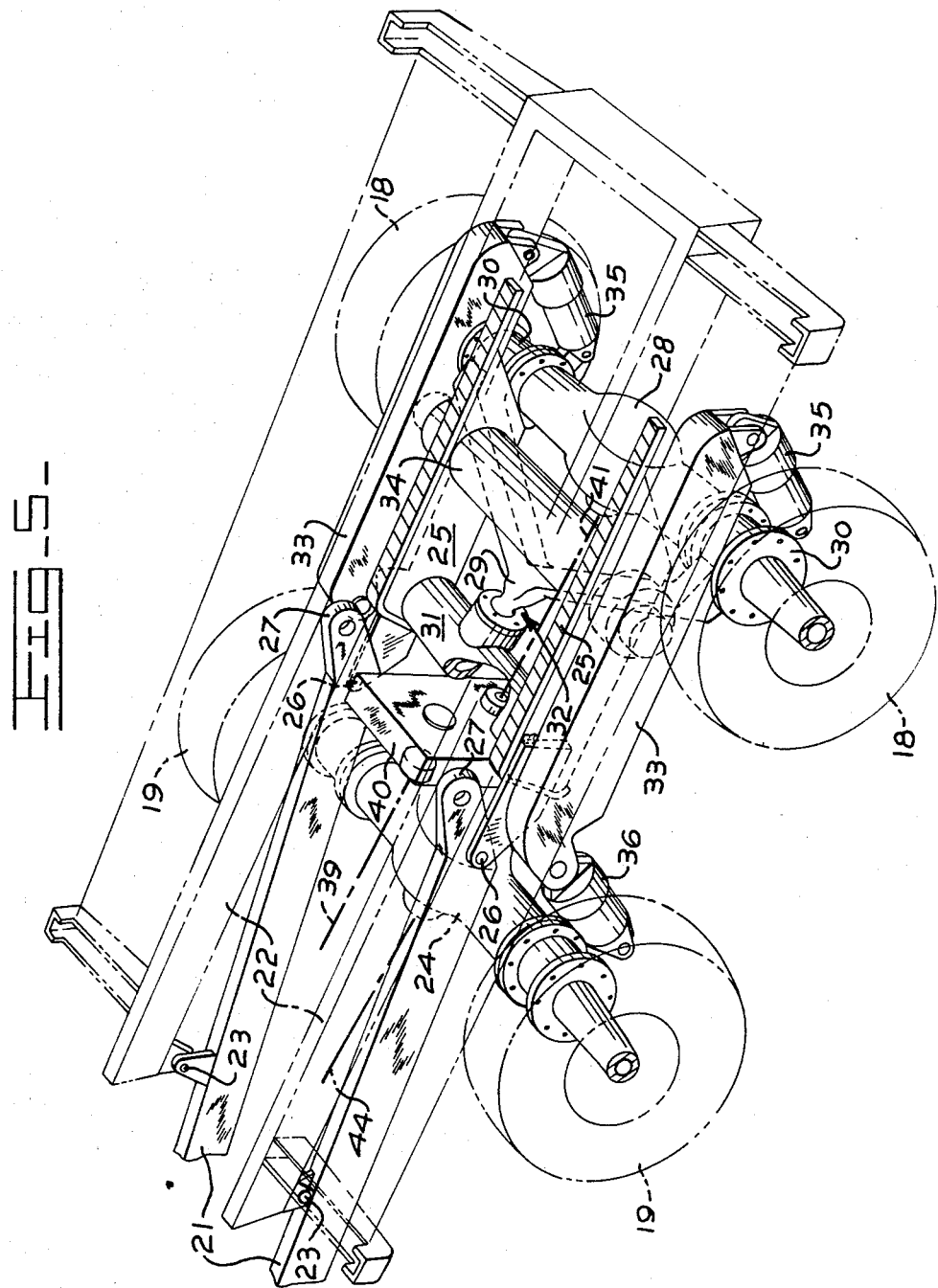

REPLACEABLE TRUCK BODY AND METHOD FOR USING SAME

BACKGROUND OF THE INVENTION

This invention relates to trucks and more particularly relates to the conversion of a conventional truck chassis to accommodate the attachment of a large truck body thereon.

Modern day earthmoving requirements dictate the need for trucks having large load carrying capacities. In standard practice, a truck manufacturer would normally meet such problem by adding a truck, having an increased load carrying capacity, to its product line. Such procedure is costly and time consuming since the truck's chassis and attendant constructions normally constitute newly developed ones.

SUMMARY OF THE INVENTION

This invention obviates such problem by adapting a conventional truck chassis for use with a truck body having a load carrying capacity which is substantially larger than the capacity of a standard body. An auxiliary frame assembly, having a pair of roadwheels mounted thereon, is detachably secured to a rearward end of the standard main frame assembly to form an extension thereof. The convention truck body is then replaced with the one having an increased load carrying capacity.

BRIEF DESCRIPTION OF THE DRAWINGS

Further objects of this invention will become apparent from the following description and accompanying drawings wherein:

FIG. 1 is a partially schematic, side elevational view of a truck having an ejector means mounted in a load transporting body thereof;

FIG. 2 is a view similar to FIG. 1, but showing the ejector means in an extended condition of operation for expelling dirt or the like from the truck body;

FIG. 3 is a top elevational view of the truck's chassis with the body removed therefrom;

FIG. 4 is an enlarged, sectional view of the ejector means, taken in the direction of arrows IV—IV in FIG. 1; and FIG. 5 is a slightly enlarged, isometric view of a portion of the truck's chassis comprising detachably secured main and auxiliary frame assemblies.

DETAILED DESCRIPTION

The truck illustrated in FIG. 1 is disposed for movement along a longitudinal axis thereof and comprises a body 10 mounted on a main frame assembly 11 and a coupled auxiliary frame assembly 12. An ejector means 13 is normally positioned at a forward end of the body for longitudinal movement towards a rearward, open end of the body which is normally closed by a swingable gate assembly 14. The truck further comprises an operator's cab 15, an engine compartment 16 and first, second and third pairs of ground engaging roadwheels 17, 18 and 19, respectively.

The end profile of a standard truck body is depicted by phantom line 20 in FIG. 1. The standard truck chassis comprises main frame assembly 11 and not auxiliary frame assembly 12, including roadwheels 18. In summary, this invention comprises the detachable securement of the auxiliary frame assembly to the main frame assembly and the replacement of a standard truck body with elongated body 10.

Referring to FIGS. 1, 3 and 5, the main frame assembly comprises a pair of longitudinally disposed and laterally spaced first members or beams 21 having overlaying beams 22 of truck body 10 attached thereto by pins 23. An axle housing 24 is attached to the main frame in a conventional manner to rotate roadwheels 19 thereon. Auxiliary frame 12 comprises a pair of laterally spaced second members 25 joined to rearward ends of first members 21 by pins 26 and preferably secured to body beams 22 by weldments or the like.

Upward extensions 27 of members 21, having pin receiving apertures formed therethrough, comprise attachment means for pivotally attaching a conventional dump body thereto. An axle housing 28, mounting wheels 18 thereon, is attached to members 25 of the auxiliary frame assembly by a Y-shaped member 29. Such member is secured to hubs 30 of the axle housing and to a tubular member 31, secured between members 25, by a universal connection 32.

The auxiliary frame assembly further comprises substantially shorter, laterally spaced third members 33 positioned outboard and closely adjacent to second members 25. Pivot means for pivotally mounting the third members on the second members comprises a tubular member 34 secured to and extending through the second members to have the third members pivotally mounted thereon. A first pair of combined shock absorbing and spring means 35 are pivotally connected by pins to rearward ends of members 33 and to axle housing 28. A second pair of shock absorbing and spring means 36 (one shown) are each pivotally connected by pins to forward ends of members 33 and to axial housing 24.

As further shown in FIGS. 1, 3 and 5, drive from the engine (not shown) is imparted to the rear or second pair of roadwheels 18 by means of a first drive output shaft 37, a transmission 38, a drive shaft 39, a drop transfer gear box 40, a drive shaft 41 and a differential (not shown) enclosed in axle housing 28. The engine also preferably drives the intermediate or third pair of roadwheels 19 by means of a second drive output shaft 42, a transmission 43, a drive shaft 44 and a differential (not shown) enclosed in axle housing 24.

Referring to FIGS. 1, 2 and 4, the ejector means comprises a pair of conventional five-stage, double-acting hydraulic cylinders 45 (one shown) each having its main housing pivotally mounted on a bracket 46 secured to body 10. The rod end of each cylinder is pivotally attached to an ejector assembly 47 extending laterally in the truck body in a conventional manner. A guide rail 48 (FIG. 4) is secured outboard on each side of the body to engage slide blocks 49, attached to the cylinders second stage (FIG. 2), and rollers 50, 51 and 52, each rotatably mounted on the ejector assembly.

Tailgate assembly 14 comprises two double acting hydraulic cylinders 53 (one shown) pivotally connected between body 10 or frame members 25 and a bracket 54. The bracket is secured to a tailgate 55 pivotally mounted at 56 on the truck body. The tailgate normally closes the open, rearward end of the truck body (FIG. 1) and is guided in its movement to its open position (FIG. 2) by laterally spaced and arcuately shaped side plates 57.

FIG. 2 schematically illustrates a hydraulic circuit, including a control valve 58 mounted in cab 15, for actuating cylinders 45 and 53 simultaneously. In the illustrated position of a control lever 59, an engine driven pump 60 communicates pressurized oil through the valve and to outlet conduits 61 and 62, operatively connected to cylinders 45 and 53, respectively. Such communication functions to extend cylinders 45 and to simultaneously retract cylinders 53 to open tailgate 55 (FIG. 2).

Conversely, movement of lever 59 in the opposite direction, past its intermediate neutral position, will function to communicate pressurized oil to the opposite ends of the cylinders via conduits 63 and 64, respectively, to retract cylinders 45 and to extend cylinders 53 (FIG. 1). During such operation, conduits 61 and 62 will, of course, function in a conventional manner to exhaust the opposing ends of the cylinders.

When it is desired to replace elongated truck body 10 of FIG. 1, with a shorter convention one, illustrated by end profile 20, drive shaft 41 is disconnected from drop box 40, pins 23 and 26 are removed, shock absorbers 36 are detached from axle housing 24 and the weldments normally securing beams 22 of the truck body to frame members 25 are released. The auxiliary frame assembly and body may then be detached from the vehicle's main chassis and a conventional dump body, for example, may be placed on main frame 21 and attached by pivot pins to extensions 27 thereof. If so desired, the forward end of the smaller replacement body, like body 10, may rest on a cross-beam 65 of the main frame assembly and may be attached thereto by pins 23 (FIG. 1).

What is claimed is:

1. A vehicle disposed on a longitudinal axis thereof comprising a chassis having a longitudinally disposed main frame assembly and a first pair of ground engaging roadwheels attached to said main frame assembly, an auxiliary frame assembly detachably secured to a rearward end of said main frame assembly and longitudinally aligned therewith to form an extension thereof, a second pair of ground engaging roadwheels attached to said auxiliary frame assembly, said main frame assembly comprising a pair of longitudinally disposed and laterally spaced first members and said auxiliary frame assembly comprising a pair of laterally spaced second members joined to said first members by pin connections and laterally spaced third members positioned outboard of and closely adjacent to said second members, pivot means transversely disposed relative to said longitudinal axis and pivotally mounting said third members on said second members, and shock absorbing means operatively connecting each of said third members to a respective one of said second roadwheels.

2. The invention of claim 1 further comprising a third pair of ground engaging roadwheels attached to said main frame and positioned between said first and second pairs of roadwheels.

3. The invention of claim 1 further comprising an elongated body attached to said main and auxiliary frames.

4. The invention of claim 3 further comprising ejector means normally positioned at a forward end of said body for longitudinal movement toward an open, rearward end thereof.

5. The invention of claim 4 further comprising gate means normally closing the rearward end of said body and adapted to open upon actuation of said ejector means.

6. The invention of claim 5 further comprising control means for selectively actuating said ejector means and said gate means simultaneously.

7. The invention of claim 2 further comprising first transmission means for driving said third pair of roadwheels and second transmission means for driving said second pair of roadwheels.

8. The invention of claim 1 wherein said body is supported on laterally spaced beams secured thereto, said beams extending longitudinally the full length of said first and second members and secured on said second members.

9. The invention of claim 1 wherein said second members are substantially shorter longitudinally than said first members.

10. The invention of claim 1 wherein said pivot means comprises a tubular member secured to and extending through said second members and having said third members pivotally mounted thereon.

11. The invention of claim 1 further comprising a third pair of ground engaging roadwheels attached to said main frame assembly and positioned between said first and second pairs of roadwheels and additional shock absorbing means operatively connecting each of said third members to a respective one of said third roadwheels.

12. A method for constructing a vehicle having an elongated truck body comprising the steps of removing a truck body from a truck having a chassis comprising a main frame assembly and two pairs of roadwheels attached to said main frame assembly, attaching an auxiliary frame assembly, having a second pair of roadwheels attached thereto, to a rearward end of said main frame assembly and in longitudinal alignment therewith attaching an elongated truck body to said main and auxiliary frame assemblies and pivotally mounting laterally spaced members on said auxiliary frame assembly and attaching a shock absorbing means between said members and each of said roadwheels.

* * * * *